(12) United States Patent  
Lai

(10) Patent No.: US 11,374,517 B2
(45) Date of Patent: Jun. 28, 2022

(54) MOTOR CONTROLLER

(71) Applicant: Global Mixed-mode Technology Inc., Hsin-Chu (TW)

(72) Inventor: Ching-Feng Lai, Taipei (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 0 days.

(21) Appl. No.: 17/026,318

(22) Filed: Sep. 21, 2020

(65) Prior Publication Data

US 2022/0094289 A1    Mar. 24, 2022

(51) Int. Cl.
    *H02P 6/26*   (2016.01)
    *H02P 6/16*   (2016.01)
    *H02P 7/291*  (2016.01)
    *H02P 7/03*   (2016.01)

(52) U.S. Cl.
    CPC ............. *H02P 7/291* (2016.02); *H02P 6/26* (2016.02); *H02P 7/04* (2016.02)

(58) Field of Classification Search
    CPC ...... H02P 6/16; H02P 6/26; H02P 7/29; H02P 21/22; H02P 7/04
    See application file for complete search history.

(56) References Cited

U.S. PATENT DOCUMENTS

| 7,301,294 | B2 * | 11/2007 | Ogino | H02P 6/17 |
| | | | | 318/400.03 |
| 7,477,082 | B2 * | 1/2009 | Fukazawa | H02P 7/04 |
| | | | | 326/82 |
| 8,044,624 | B2 * | 10/2011 | Matsuo | F02D 41/221 |
| | | | | 361/33 |
| 8,222,846 | B2 * | 7/2012 | Sugie | H02P 6/085 |
| | | | | 318/400.29 |
| 8,310,188 | B2 * | 11/2012 | Nakai | H02P 6/14 |
| | | | | 318/400.29 |
| 8,390,222 | B2 * | 3/2013 | Seki | H02M 7/5387 |
| | | | | 318/400.29 |
| 9,154,063 | B2 * | 10/2015 | Inoue | H02P 6/085 |
| 9,362,847 | B2 * | 6/2016 | Tomohara | H02P 7/29 |
| 10,644,629 | B2 * | 5/2020 | Noie | H02M 3/156 |
| 2009/0045762 | A1 * | 2/2009 | Hayashi | H02P 7/28 |
| | | | | 318/504 |

(Continued)

FOREIGN PATENT DOCUMENTS

CN  205961004 U  *  2/2017
CN  106253772 B     9/2018
(Continued)

*Primary Examiner* — Thai T Dinh
(74) *Attorney, Agent, or Firm* — Winston Hsu

(57) ABSTRACT

A motor controller configured to reduce the motor noise by detecting the zero point of the motor current is disclosed. The motor controller comprises a switch circuit, a pre-driver, a phase detecting unit, a control unit, a comparator, a first resistor, and a second resistor. The switch circuit is an H-bridge circuit. The switch circuit includes a first upper-side switch, a second upper-side switch, a first lower-side switch, and a second lower-side switch. When the motor controller performs the last pulse width modulation driving with respect to the first lower-side switch before phase switching, the second upper-side switch is turned off and the first lower-side switch is kept turning on, so as to facilitate the detection of the zero point of the motor current.

4 Claims, 5 Drawing Sheets

(56) References Cited

U.S. PATENT DOCUMENTS

| | | |
|---|---|---|
| 2018/0241339 A1 | 8/2018 | Endoh |
| 2019/0067267 A1* | 2/2019 | Shishikura ................ H02P 7/04 |
| 2019/0229646 A1 | 7/2019 | Liu |

FOREIGN PATENT DOCUMENTS

| | | | |
|---|---|---|---|
| CN | 207947735 U | * | 10/2018 |
| CN | 208836038 U | | 5/2019 |
| TW | I435532 B | | 4/2014 |

* cited by examiner

MOTOR CONTROLLER

BACKGROUND OF THE INVENTION

1. Field of the Invention

The present invention relates to a motor controller, and more particularly, to a motor controller which is capable of reducing the motor noise by detecting the zero point of the motor current.

2. Description of the Prior Art

FIG. 1 is a circuit diagram showing a conventional motor controller. A motor controller 10 is used for driving a motor, where the motor has a motor coil L. The motor coil L has a first terminal O1 and a second terminal O2. The motor controller 10 comprises a switch circuit 100, a control unit 110, a phase detecting unit 120, and a resistor R. The switch circuit 100 is coupled to a terminal VCC and a terminal S. The resistor R is coupled to the terminal S and a terminal GND, where the terminal S may be coupled to a sensing pin. The switch circuit includes a transistor 101, a transistor 102, a transistor 103, and a transistor 104 for supplying a motor current IL to the motor coil L. Each of the first transistor 101 and the third transistor 103 is a p-type MOSFET while each of the second transistor 102 and the fourth transistor 104 is an n-type MOSFET. The phase detecting unit 120 generates a phase signal Vph to the control unit 110, so as to inform the control unit 110 to switch phases. The control unit 110 generates a first control signal C1, a second control signal C2, a third control signal C3, and a fourth control signal C4, so as to respectively control the ON/OFF states of the transistor 101, the transistor 102, the transistor 103, and the transistor 104. However, due to the effect of the back electromotive force during the rotation of the motor, the motor current IL left at the time point of phase switching will result in the mechanical noise. Conventionally, it is capable of controlling the motor current IL at subsequent time points of phase switching by detecting the zero point of the motor current IL, so as to reduce the mechanical noise.

When the motor controller 10 utilizes the pulse width modulation technique to drive the motor, the driving mode may be an N-type pulse width modulation mode or a P-type pulse width modulation mode. FIG. 2 is a timing chart showing the related signals of FIG. 1 under the P-type pulse width modulation mode. Please refer to FIG. 1 and FIG. 2 simultaneously. When the P-type pulse width modulation mode is chosen to drive the motor, each of the first control signal C1 and the third control signal C3 is a pulse width modulation signal for alternatively controlling the ON/OFF states of the transistor 101 and the transistor 103, so as to adjust the motor speed. However, the disadvantage of the P-type pulse width modulation mode is that it is not easy to design such driving method. The advantage of the P-type pulse width modulation mode is that when the zero point of the motor current IL is detected at the time point T1, the voltage of the terminal S is compared for determining the zero point of the motor current IL, such that the detection method is simple. FIG. 3 is a timing chart showing the related signals of FIG. 1 under the N-type pulse width modulation mode. Please refer to FIG. 1 and FIG. 3 simultaneously. When the N-type pulse width modulation mode is chosen to drive the motor, each of the second control signal C2 and the fourth control signal C4 is a pulse width modulation signal for alternatively controlling the ON/OFF states of the transistor 102 and the transistor 104, so as to adjust the motor speed. The advantage of the N-type pulse width modulation mode is that it is easy to design such driving method. However, the disadvantage of the N-type pulse width modulation mode is that when the zero point of the motor current IL is detected at the time point T2, the voltage of the terminal VCC is compared for determining the zero point of the motor current IL, such that the detection method is complicated. Therefore, it has become an important issue to make good use of the advantages of the two driving modes.

SUMMARY OF THE INVENTION

According to one embodiment of the present invention, a motor controller which is capable of reducing the motor noise by detecting the zero point of the motor current is provided. The motor controller is used for driving a motor, where the motor has a motor coil. The motor coil has a first terminal and a second terminal. The motor controller comprises a switch circuit, a pre-driver, a phase detecting unit, a control unit, a comparator, a first resistor, and a second resistor. The switch circuit is coupled to a terminal VCC and a terminal S. The first resistor is coupled to the terminal S and a terminal GND, where the terminal S may be coupled to a sensing pin. The switch circuit includes a first transistor, a second transistor, a third transistor, and a fourth transistor for supplying a motor current to the motor coil. The first transistor is coupled to the terminal VCC and the first terminal while the second transistor is coupled to the first terminal and the terminal S. The third transistor is coupled to the terminal VCC and the second terminal while the fourth transistor is coupled to the second terminal and the terminal S. Moreover, the switch circuit is an H-bridge circuit. Each of the first transistor and the third transistor is an upper-side switch while each of the second transistor and the fourth transistor is a lower-side switch. The first transistor may be a first upper-side switch. The second transistor may be a first lower-side switch. The third transistor may be a second upper-side switch. The fourth transistor may be a second lower-side switch. The phase detecting unit generates a phase signal to the control unit, so as to inform the control unit to switch phases. The control unit receives the phase signal and a detecting signal for generating a control signal to the pre-driver. Based on the control signal, the pre-driver generates a plurality of driving signals to control the switch circuit.

When the motor controller performs the last pulse width modulation driving with respect to a lower-side switch before phase switching, an upper-side switch is turned off and the lower-side switch is kept turning on, so as to facilitate the detection of the zero point of the motor current. The comparator may generate the detecting signal to the control unit for detecting the zero point of the motor current by comparing the voltage of the first terminal with the voltage of the terminal S. Also, the comparator may generate the detecting signal to the control unit for detecting the zero point of the motor current by comparing the voltage of the second terminal with the voltage of the terminal S.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
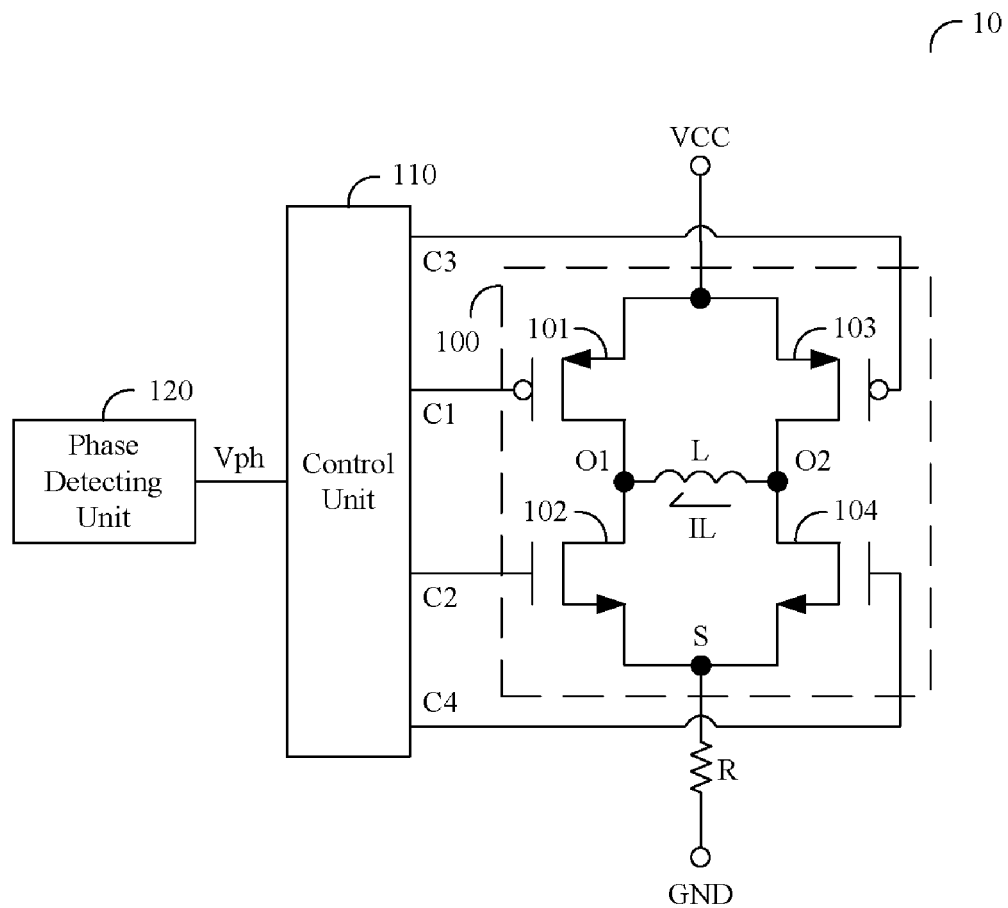
FIG. 1 is a circuit diagram showing a conventional motor controller.
Figure 2:
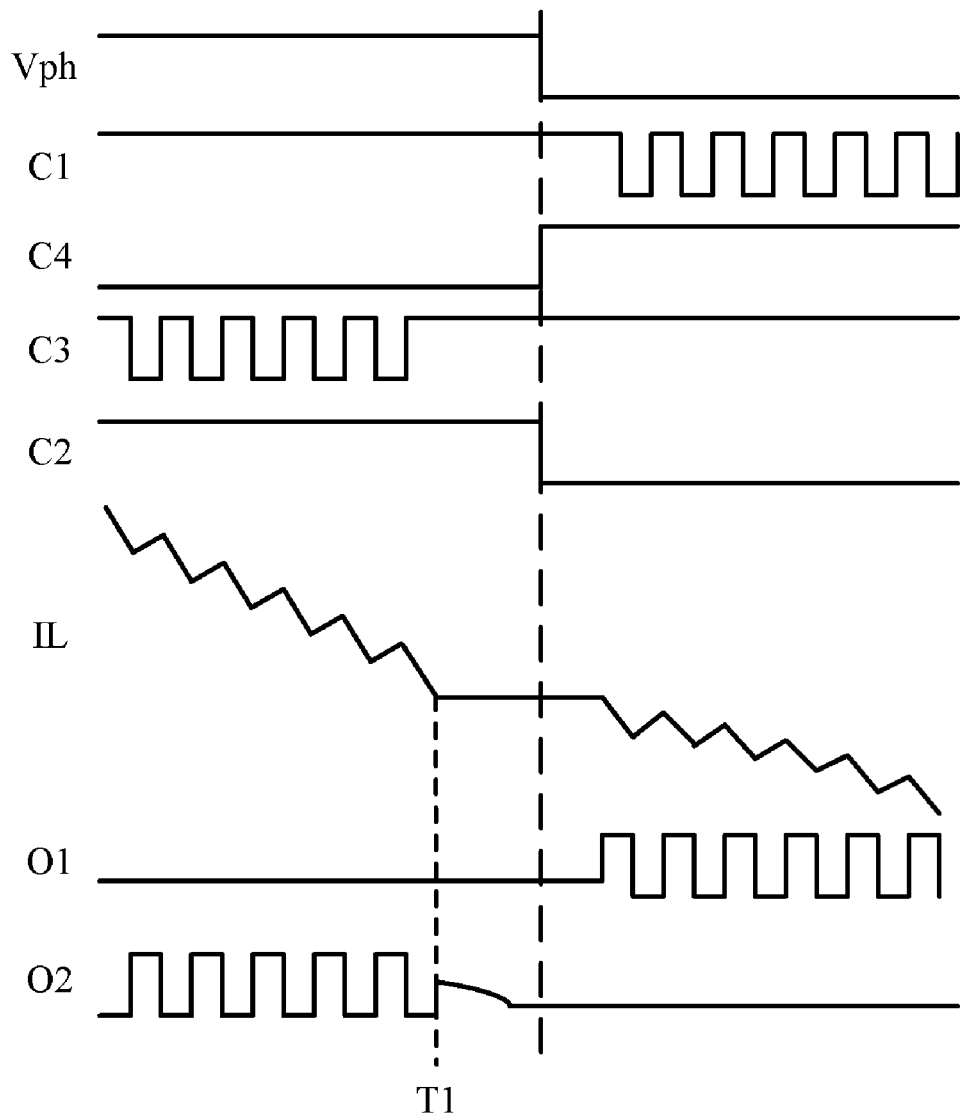
FIG. 2 is a timing chart showing timing signals of FIG. 1 under a P-type pulse width modulation mode.
Figure 3:
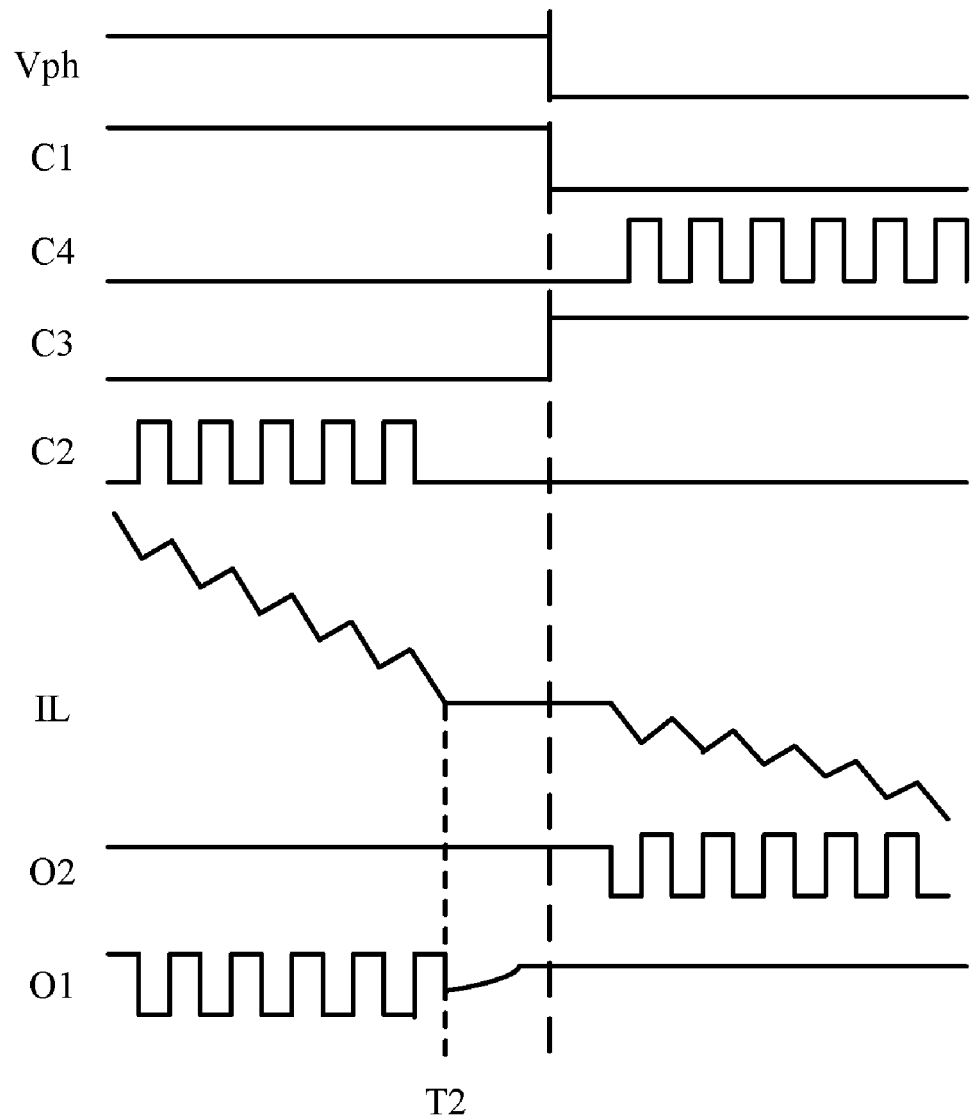
FIG. 3 is a timing chart showing timing signals of FIG. 1 under an N-type pulse width modulation mode.
Figure 4:
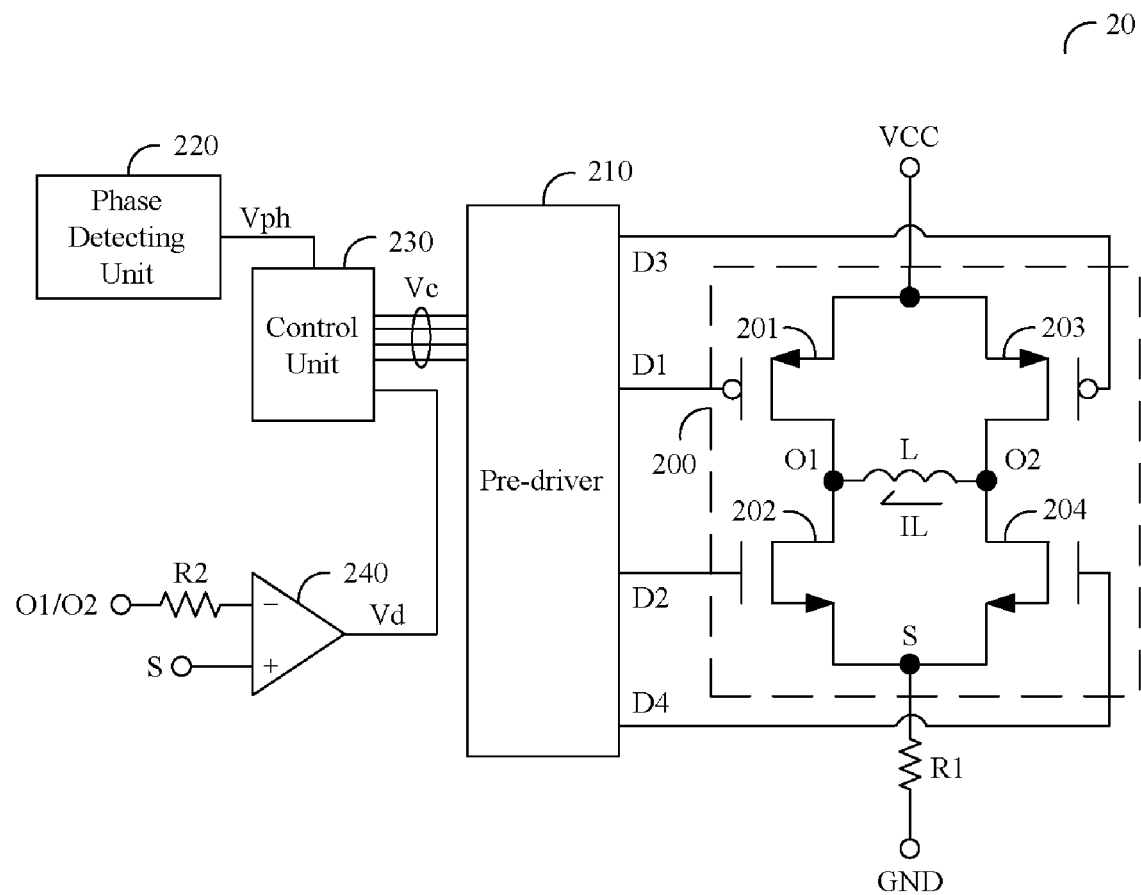
FIG. 4 is a circuit diagram showing a motor controller according to one embodiment of the present invention.

FIG. 4 is a circuit diagram showing a motor controller according to one embodiment of the present invention. A motor controller 20 is used for driving a motor, where the motor has a motor coil L. The motor coil L has a first terminal O1 and a second terminal O2. The motor controller 20 comprises a switch circuit 200, a pre-driver 210, a phase detecting unit 220, a control unit 230, a comparator 240, a first resistor R1, and a second resistor R2. The switch circuit 200 is coupled to a terminal VCC and a terminal S. The first resistor R1 is coupled to the terminal S and a terminal GND, where the terminal S may be coupled to a sensing pin. The switch circuit 200 includes a first transistor 201, a second transistor 202, a third transistor 203, and a fourth transistor 204 for supplying a motor current IL to the motor coil L. The first transistor 201 is coupled to the terminal VCC and the first terminal O1 while the second transistor 202 is coupled to the first terminal O1 and the terminal S. The third transistor 203 is coupled to the terminal VCC and the second terminal O2 while the fourth transistor 204 is coupled to the second terminal O2 and the terminal S. Each of the first transistor 201 and the third transistor 203 may be a p-type MOSFET while each of the second transistor 202 and the fourth transistor 204 may be an n-type MOSFET. Moreover, the switch circuit 200 is an H-bridge circuit. Each of the first transistor 201 and the third transistor 203 is an upper-side switch while each of the second transistor 202 and the fourth transistor 204 is a lower-side switch. The first transistor 201 may be a first upper-side switch. The second transistor 202 may be a first lower-side switch. The third transistor 203 may be a second upper-side switch. The fourth transistor 204 may be a second lower-side switch. The phase detecting unit 220 generates a phase signal Vph to the control unit 230, so as to inform the control unit 230 to switch phases. The control unit 230 receives the phase signal Vph and a detecting signal Vd for generating a control signal Vc to the pre-driver 210. Based on the control signal Vc, the pre-driver generates a first driving signal D1, a second driving signal D2, a third driving signal D3, and a fourth driving signal D4 for respectively controlling the ON/OFF states of the first transistor 201, the second transistor 202, the third transistor 203, and the fourth transistor 204.

Figure 5:
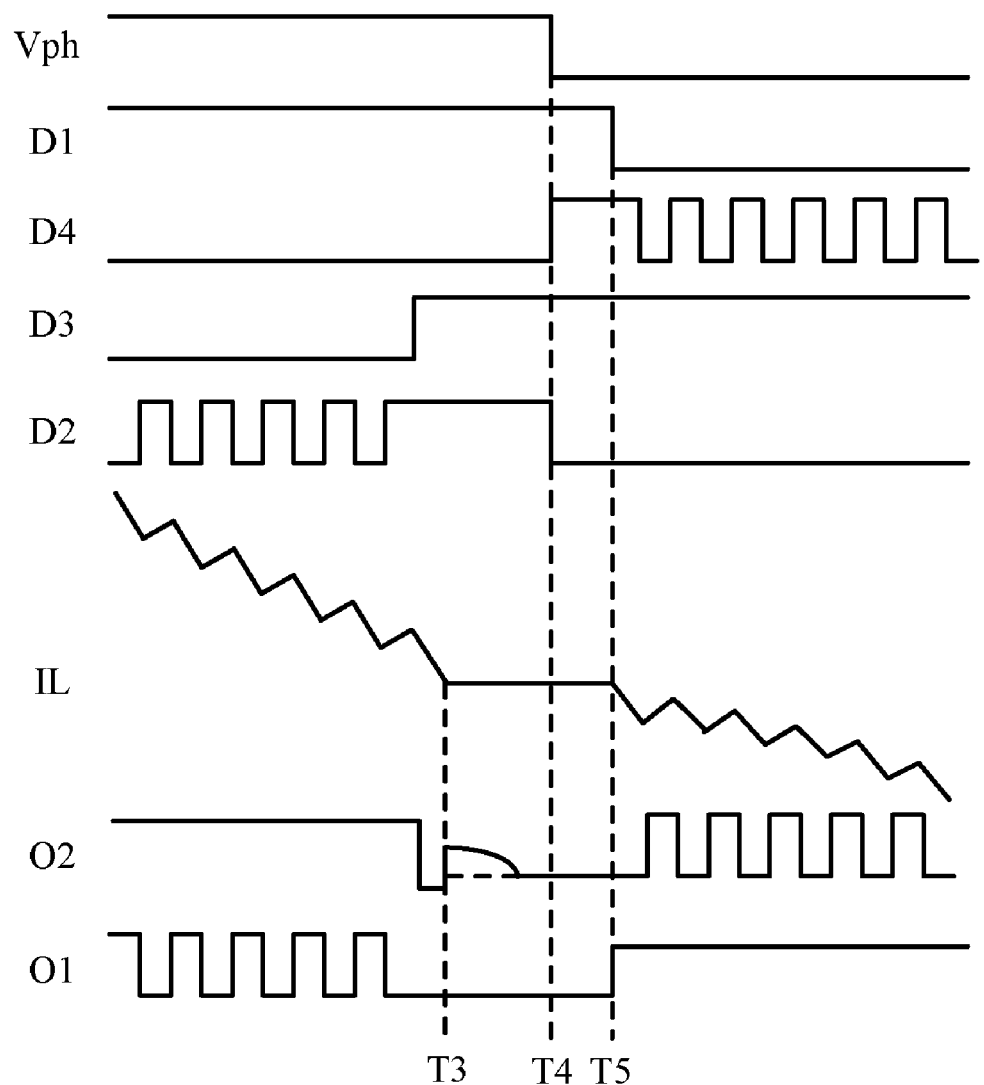
FIG. 5 is a timing chart according to one embodiment of the present invention.

More specifically, an N-type pulse width modulation mode is chosen to drive the motor according to one embodiment of the present invention. That is, each of the second driving signal D2 and the fourth driving signal D4 is a pulse width modulation signal for alternatively controlling the ON/OFF states of the second transistor 202 and the fourth transistor 204, so as to adjust the motor speed. FIG. 5 is a timing chart according to one embodiment of the present invention, where T4 is a phase switching time point. Please refer to FIG. 4 and FIG. 5 simultaneously. When the motor controller 20 performs the last pulse width modulation driving with respect to the second transistor 202 before phase switching, the second driving signal D2 is a high level H while the third driving signal D3 is a low level L, so as to turn on the second transistor 202 and the third transistor 203. Then after a pre-determined time, the third driving signal D3 is changed from the low level L to the high level H for turning off the third transistor 203, while the second transistor 202 is kept turning on until the phase switching time point T4, such that the motor current IL flows through the second transistor 202. When the motor current IL decreases to 0, the voltage of the second terminal O2 increases from a negative level to a positive level. Thus, it is capable of detecting the zero point of the motor current IL by comparing the voltage of the second terminal O2 with the voltage of the terminal S at the time point T3. In the same manner, based on the same operation method, when the motor is operated in the next phase, it is capable of detecting the zero point of the motor current IL by comparing the voltage of the first terminal O1 with the voltage of the terminal S. According to the above analysis, the comparator 240 may be designed to detect the zero point of the motor current IL. The comparator 240 comprises a first input terminal and a second input terminal, where the first input terminal is coupled to the terminal S while the second input terminal is coupled to the first terminal O1 or the terminal O2 via the second resistor R2, such that the comparator 240 is configured to detect the zero point of the motor current IL. The second resistor R2 is a current limiting resistor. When the second input terminal is coupled to the first terminal O1 via the second resistor R2, the comparator 240 is configured to generate the detecting signal Vd to the control unit 230 by comparing the voltage of the first terminal O1 with the voltage of the terminal S. When the second input terminal is coupled to the second terminal O2 via the second resistor R2, the comparator 240 is configured to generate the detecting signal Vd to the control unit 230 by comparing the voltage of the second terminal O2 with the voltage of the terminal S.

When the motor controller 20 switches the phase at the phase switching time point T4, the second transistor 202 is turned off and the fourth transistor 204 is turned on, so as to start the operation in the next phase. After the first transistor 201 is turned on at the time point T5, it is capable of adjusting the motor speed by controlling the ON/OFF states of the fourth transistor 204 via the driving signal D4.

According to one embodiment of the present invention, the motor controller 20 can be applied to a single-phase brushless DC motor. The N-type pulse width modulation mode is utilized for driving the motor according to one embodiment of the present invention. When the motor controller 20 performs the last pulse width modulation driving with respect to a lower-side switch before phase switching, an upper-side switch is turned off and the lower-side switch is kept turning on, so as to facilitate the detection of the zero point of the motor current IL. The motor controller 20 may detect the zero point of the motor current IL by comparing the voltage of the first terminal O1 with the voltage of the terminal S. Also, the motor controller 20 may detect the zero point of the motor current IL by comparing the voltage of the second terminal O2 with the voltage of the terminal S. Thus, the motor controller 20 gets the advantages of the N-type pulse width modulation mode and the P-type pulse width modulation mode. Moreover, it is capable of controlling the motor current IL at subsequent time points of phase switching by detecting the zero point of the motor current IL, so as to reduce the motor noise and increase the efficiency.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a motor, wherein the motor has a motor coil, the motor coil has a first terminal and a second terminal, and the motor controller comprises:
   a switch circuit, configured to supply a motor current to the motor coil, wherein the switch circuit comprises a first upper-side switch, a second upper-side switch, a first lower-side switch, and a second lower-side switch, the first upper switch is coupled to a third terminal and the first terminal, the first lower-side switch is coupled to the first terminal and a fourth terminal, the second upper-side switch is coupled to the third terminal and the second terminal, and the second lower-side switch is coupled to the second terminal and the fourth terminal;
   a pre-driver, configured to generate a plurality of driving signals to control the switch circuit;
   a control unit, configured to generate a control signal to the pre-driver;
   a phase detecting unit, configured to generate a phase signal to the control unit;
   a first resistor, coupled to the fourth terminal and a fifth terminal; and
   a comparator, coupled to the first terminal and the fourth terminal for generating a detecting signal to the control unit, wherein when the motor controller performs a last pulse width modulation driving with respect to the first lower-side switch before phase switching, the second upper-side switch is turned off and the first lower-side switch is kept turning on.

2. The motor controller of claim 1, wherein the motor controller further comprises a second resistor, and the comparator is coupled to the first terminal via the second resistor.

3. The motor controller of claim 1, wherein the first lower-side switch is kept turning on until a phase switching time point.

4. The motor controller of claim 1, wherein the motor controller is applied to a single-phase brushless DC motor.

* * * * *